US011236204B2

(12) United States Patent
Favresse et al.

(10) Patent No.: US 11,236,204 B2
(45) Date of Patent: Feb. 1, 2022

(54) PRODUCTION OF SIOC-BONDED POLYETHER SILOXANES

(71) Applicant: Evonik Operations GmbH, Essen (DE)

(72) Inventors: Philippe Favresse, Ratingen (DE); Michael Fiedel, Essen (DE); Ute Hesse, Essen (DE)

(73) Assignee: Evonik Operations GmbH, Essen (DE)

(*) Notice: Subject to any disclaimer, the term of this patent is extended or adjusted under 35 U.S.C. 154(b) by 0 days.

(21) Appl. No.: 15/929,839

(22) Filed: May 26, 2020

(65) Prior Publication Data

US 2020/0377667 A1 Dec. 3, 2020

(30) Foreign Application Priority Data

May 28, 2019 (EP) .................................... 19176883

(51) Int. Cl.
| | | |
|---|---|---|
| *C08G 77/46* | (2006.01) | |
| *C08G 77/08* | (2006.01) | |
| *B01J 31/02* | (2006.01) | |
| *C08G 77/18* | (2006.01) | |
| *C08L 71/02* | (2006.01) | |

(52) U.S. Cl.
CPC .......... *C08G 77/46* (2013.01); *B01J 31/0224* (2013.01); *C08G 77/08* (2013.01); *C08G 77/18* (2013.01); *C08L 71/02* (2013.01); *B01J 2531/12* (2013.01); *B01J 2531/13* (2013.01); *B01J 2531/26* (2013.01); *B01J 2531/31* (2013.01); *B01J 2531/54* (2013.01); *B01J 2531/842* (2013.01)

(58) Field of Classification Search
CPC .............................. C08G 77/08; C08G 77/46
USPC ........................................................ 528/23
See application file for complete search history.

(56) References Cited

U.S. PATENT DOCUMENTS

| | | | |
|---|---|---|---|
| 3,133,111 A * | 5/1964 | Wheeler, Jr. .......... | C08G 77/50 |
| | | | 556/446 |
| 7,442,724 B2 | 10/2008 | Esselborn et al. | |
| 7,838,603 B2 | 11/2010 | Schwab et al. | |
| 8,729,207 B2 | 5/2014 | Hartung et al. | |
| 9,115,335 B2 | 8/2015 | Trosin et al. | |
| 9,346,919 B2 | 5/2016 | Jazkewitsch et al. | |
| 9,353,225 B2 | 5/2016 | Knott et al. | |
| 9,481,695 B2 | 11/2016 | Knott et al. | |
| 9,738,797 B2 | 8/2017 | Nilewski et al. | |
| 9,790,327 B2 | 10/2017 | Klotzbach et al. | |
| 9,896,541 B2 | 2/2018 | Fiedel et al. | |
| 10,010,838 B2 | 7/2018 | Favresse et al. | |
| 10,106,644 B2 | 10/2018 | Fiedel et al. | |
| 10,106,649 B2 | 10/2018 | Fiedel et al. | |
| 10,287,454 B2 | 5/2019 | Klotzbach et al. | |
| 10,399,051 B2 | 9/2019 | Favresse et al. | |
| 10,414,872 B2 | 9/2019 | Knott et al. | |
| 10,457,769 B2 | 10/2019 | Günther et al. | |
| 10,577,512 B2 | 3/2020 | Aitha et al. | |
| 10,703,851 B2 | 7/2020 | Günther et al. | |
| 10,752,801 B2 | 8/2020 | Favresse et al. | |
| 2004/0014925 A1 | 1/2004 | Hell et al. | |
| 2004/0186260 A1 * | 9/2004 | Hohenberg ............ | C08G 77/38 |
| | | | 528/25 |
| 2005/0085563 A1 | 4/2005 | Esselborn et al. | |
| 2005/0187377 A1 * | 8/2005 | Sheehan ................. | C08F 6/003 |
| | | | 528/493 |
| 2008/0221276 A1 | 9/2008 | Schwab et al. | |
| 2011/0144269 A1 | 6/2011 | Kuppert et al. | |
| 2011/0294714 A1 * | 12/2011 | Delbrassinne ......... | C08L 83/04 |
| | | | 510/343 |
| 2012/0010302 A1 | 1/2012 | Hartung et al. | |
| 2012/0037036 A1 | 2/2012 | Veit et al. | |
| 2013/0035452 A1 | 2/2013 | Kuppert et al. | |
| 2013/0213267 A1 | 8/2013 | Fiedel et al. | |
| 2013/0217930 A1 | 8/2013 | Haensel et al. | |
| 2013/0281552 A1 | 10/2013 | Nilewski et al. | |
| 2014/0274863 A1 | 9/2014 | Trosin et al. | |
| 2014/0303065 A1 | 10/2014 | Jazkewitsch et al. | |
| 2015/0023900 A1 | 1/2015 | Knott et al. | |
| 2015/0057412 A1 | 2/2015 | Knott et al. | |
| 2016/0160081 A1 | 6/2016 | Klotzbach et al. | |

(Continued)

FOREIGN PATENT DOCUMENTS

| | | |
|---|---|---|
| DE | 24 13 987 | 9/1975 |
| EP | 1 634 940 | 3/2006 |

(Continued)

OTHER PUBLICATIONS

U.S. Appl. No. 10/619,395, filed Jul. 15, 2003, 2004/0014925, Hell et al.

(Continued)

*Primary Examiner* — Marc S Zimmer
(74) *Attorney, Agent, or Firm* — Grüneberg and Myers PLLC

(57) ABSTRACT

SiOC-bonded polyether siloxanes are produced by transesterification of alkoxysiloxanes with polyetherols in the presence of trifluoromethanesulfonate as catalyst. The computational total water content of the reactants including alkoxysiloxanes and polyetherols is ≤5000 ppm by mass, advantageously ≤300 ppm by mass, preferably ≤150 ppm by mass, more preferably ≤100 ppm by mass, in particular ≤50 ppm by mass. The determination of the individual water contents is performed beforehand, preferably by titration according to Karl Fischer.

24 Claims, No Drawings

(56) References Cited

U.S. PATENT DOCUMENTS

| | | |
|---|---|---|
| 2016/0208050 A1 | 7/2016 | Klotzbach et al. |
| 2016/0339397 A1* | 11/2016 | Bhuwania .......... B01D 67/0002 |
| 2017/0081464 A1 | 3/2017 | Fiedel et al. |
| 2017/0081469 A1 | 3/2017 | Fiedel et al. |
| 2017/0088667 A1 | 3/2017 | Fiedel et al. |
| 2017/0152343 A1 | 6/2017 | Günther et al. |
| 2017/0174817 A1 | 6/2017 | Günther et al. |
| 2017/0274335 A1 | 9/2017 | Favresse et al. |
| 2018/0028994 A1 | 2/2018 | Favresse et al. |
| 2018/0094146 A1 | 4/2018 | Aitha et al. |
| 2018/0194889 A1 | 7/2018 | Günther et al. |
| 2018/0298149 A1* | 10/2018 | Engelbrecht .......... C08G 77/18 |
| 2019/0031880 A1 | 1/2019 | Cavaleiro et al. |
| 2019/0040205 A1 | 2/2019 | Knott et al. |
| 2019/0092904 A1 | 3/2019 | Fiedel et al. |
| 2019/0112502 A1 | 4/2019 | Sloot et al. |
| 2019/0194488 A1 | 6/2019 | Favresse et al. |
| 2019/0241741 A1 | 8/2019 | Seyfried et al. |
| 2019/0292404 A1 | 9/2019 | Fiedel et al. |
| 2020/0216474 A1 | 7/2020 | Fiedel et al. |

FOREIGN PATENT DOCUMENTS

| | | |
|---|---|---|
| EP | 3 438 158 | 2/2019 |
| WO | 2008/074564 | 6/2008 |
| WO | 2010/046181 | 4/2010 |
| WO | 2016/020137 | 2/2016 |
| WO | 2016/020140 | 2/2016 |
| WO | 2016/020200 | 2/2016 |
| WO | 2016/020201 | 2/2016 |
| WO | 2018/134291 | 7/2018 |
| WO | 2019/076552 | 4/2019 |
| WO | 2020/114762 | 6/2020 |

OTHER PUBLICATIONS

U.S. Appl. No. 13/058,372, filed Feb. 10, 2011, 2011/0144269, Kuppert et al.
U.S. Appl. No. 13/642,323, filed Oct. 19, 2012, 2013/0035452, Kuppert et al.
U.S. Appl. No. 13/205,834, filed Aug. 9, 2011, 2012/0037036, Veit et al.
U.S. Appl. No. 13/771,921, filed Feb. 20, 2013, 2013/0213267, Fiedel et al.
U.S. Appl. No. 13/771,973, filed Feb. 20, 2013, 2013/0217930, Haensel et al.
U.S. Appl. No. 15/323,154, filed Dec. 30, 2016, 2018/0194889, Günther et al.
U.S. Appl. No. 16/143,543, filed Sep. 27, 2018, 2019/0092904, Fiedel et al.
U.S. Appl. No. 15/743,232, filed Jan. 9, 2018, 2019/0292404, Fiedel et al.
U.S. Appl. No. 16/044,960, filed Jul. 25, 2018, 2019/0031880, Cavaleiro et al.
U.S. Appl. No. 16/268,606, filed Feb. 6, 2019, 2019/00241741, Seyfried et al.
U.S. Appl. No. 16/142,408, filed Sep. 26, 2018, 2019/0112502, Sloot et al.
European Search Report dated Nov. 15, 2019 in European Application No. 19176883.7.

* cited by examiner

PRODUCTION OF SIOC-BONDED POLYETHER SILOXANES

CROSS-REFERENCE TO RELATED APPLICATION

The present application claims the benefit to European application EP 19176883.7, filed on May 28, 2019, the content of which is hereby incorporated by reference in its entirety.

BACKGROUND OF THE INVENTION

Field of the Invention

The invention is in the field of polyether siloxanes. In particular, it relates to a process for producing SiOC-bonded polyether siloxanes from alkoxypolysiloxanes by transesterification with polyetherols.

Discussion of the Background

SiOC-bonded polyether siloxanes are known constituents of defoamers which show particular efficacy and stability for defoaming aqueous and nonaqueous media. This includes not only foam inhibition, defoaming and very good storage stability but also excellent compatibility in aqueous and nonaqueous media. All of these properties are very important for modern paint applications.

In the present case the term "defoamer" comprises not only products and formulations which prevent foam but also those which destroy foam or allow deaeration. In practice the boundaries between these products are fluid and the common umbrella term defoamer is therefore used here.

In many industrial processes, particularly when employing aqueous media, it is necessary to inhibit or even entirely prevent the undesired formation of foam during production or processing steps since foam or froth layers which accumulate during stirring and dispersing operations or collect in the containers during the filling procedure can prolong production times or else reduce the effective volume of the plant/even prevent correct operation thereof (overflow, lack of color transfer).

This is achievable by adding defoamers which even at very low usage concentrations from about 0.001% by weight are capable of avoiding or destroying undesired foams without bringing about any surface defects after application of the systems. In practice this latter factor is at least as important as good defoaming.

Surface defects are to be understood as meaning characteristics undesired by the user such as for example pinholes, craters, gloss reduction, orange peel effect, wrinkle formation and loss of adhesion in the coating system. However, a corresponding long-term stability of the formulation is also very important for the user since products such as paints are often not used immediately but sometimes only after a relatively lengthy period of storage. If stored under extreme climatic conditions (heat and incident sunlight) the efficacy of a defoamer formulation can sometimes collapse after only a short time.

The synthesis of polyether siloxanes is carried out by the joining of a polyether to a polysiloxane chain via an Si—OC or Si—C bond. At this point the chemistry provides numerous options of different polyether siloxane structures. Accordingly, not only linear structures subdivided into two subclasses—the A-B-A triblock copolymer structures and the A-(B-A)x and C-A-(B-A)x-C1 multi-block copolymer structures—but also slightly or strongly branched copolymer structures and comb-like copolymers may be synthesized.

Those skilled in the art are aware that these SiOC-bonded polyether siloxanes are a product class that does not tend to resinify. Even if SiOC-bonded polyether siloxanes comprise reactive groups, such as for instance hydroxyl groups, they are not used for intentional crosslinking. In contrast to silicone resins they are not film-forming.

Numerous transesterification processes are known from the related art. For example, WO2011/060050 A1 concerns a coating system consisting of a binder and particles, wherein the use of particular siloxane-based modifying agents is of central importance. A route to these modifying agents is provided by dehydrogenative coupling of SiH-bearing siloxanes with polyalkylene glycol monoalkyl ethers in which zinc acetylacetonate functions as a catalyst.

WO2015/039837 A1 claims a hydroxyl-containing silicone-polyester-acrylate binder and the production and use thereof. It is elucidated therein that inter alia zinc acetylacetonate is a catalyst which in the presence of moisture promotes the hydrolysis and condensation of silyltrialkoxy groups and thus brings about the curing of the system even at room temperature. Similarly, EP 2636696 A1 too recites zinc acetylacetonate as a suitable hydrolysis and condensation catalyst for curing modified alkoxylation products comprising a non-terminal alkoxysilyl group and a plurality of urethane groups.

Transesterification processes on alkoxyorganosilicon compounds, run either batchwise or continuously, are typically catalysed by addition of acids or bases, as disclosed for example in U.S. Pat. No. 6,489,500 B2.

Older patent documents such as U.S. Pat. Nos. 2,917,480 and 2,834,748 recite organic acids such as monochloroacetic acid, perfluoroacetic acid or else alkaline compounds such as potassium silane oxide as catalysts to be used.

Apart from the use of pure acids or bases and devoted to the objective of providing an improved process for the transesterification of alkoxysilicone compounds, U.S. Pat. No. 3,133,111 in this connection discloses as catalyst the salt-like combination consisting of the simple aliphatic acids having 1 to 7 carbon atoms or of the chlorinated acids derived therefrom or else in particular from the perfluorinated acids derived therefrom with a basic component which comprises the alkali metal hydroxides of the alkali metals whose atomic number is greater than 11 and also ammonium hydroxide, quaternary alkylammonium hydroxides, nitrogen-containing organic bases, with the proviso that the acid represented in the salt combination is present in superstoichiometric concentration.

U.S. Pat. No. 3,801,616 concerns the production of SiOC-based liquid siloxane polyoxyalkylene block copolymers by transesterification reactions between alkoxy-comprising siloxanes and polyoxyalkylenes having at least one alcoholic function each in the presence of salt-like catalysts having a defined water solubility and a pH window defined in aqueous solution.

In the production of thermally curable silicone resins for use as electrical insulation material, U.S. Pat. No. 4,408,031 recites as transesterification catalysts titanate esters, cobalt salts of organic acids or organic acids or sulfonic acids, such as preferably para-toluenesulfonic acid or benzenesulfonic acid.

In addition to the previously mentioned alkyl titanates, for example butyl titanate, EP 1136494 A2 also recites tin compounds such as dibutyltin dilaurate.

It must further be noted that the transesterification reaction on a highly crosslinked silicone resin is a technically low hurdle since, even in the case of an unfortunate selection of a catalyst recited in the related art, side reactions such as undesired equilibration or skeletal rearrangement do not occur.

A much higher technical hurdle by contrast is that of reproducibly clean production of SiOC-bonded polyether siloxanes by transesterification of alkoxysiloxanes with polyetherols, particularly when the target products are inputs for very demanding applications as surface-active substances. High, if not quantitative, conversions are mandatory here in order to reliably establish the particular effect.

Zinc acetylacetonate Zn(acac)$_2$ is known as a catalyst for numerous reactions.

EP 34 38 158 A1 discloses a process for producing SiOC-bonded polyether siloxanes by transesterification of alkoxysilanes with polyetherols in the presence of zinc acetylacetonate as a catalyst. This process has the advantage that it no longer requires the use of acids or bases which in industrial practice necessitate elevated safety measures in their handling but also in the choice of suitable vessel materials.

However, it has been found that the process according to EP 34 38 158 A1 forms hexamethylcyclotrisiloxane (D3) as a by-product. D3 has a propensity for being deposited on the production conduits and thus causes servicing and maintenance costs.

It is therefore desirable to provide a process which does not have the abovementioned disadvantages.

It has now been found that, surprisingly, on the basis of the process according to EP 34 38 158 A1, trifluoromethanesulfonate is in fact suitable as a particularly excellent catalyst for the transesterification of alkoxysiloxanes with polyetherols and thus for the production of chemically complex systems; in particular the formation of hexamethylcyclotrisiloxanes can be at least minimized or significantly reduced.

SUMMARY OF THE INVENTION

The present invention includes the following embodiments.

1.) Process for producing SiOC-bonded polyether siloxanes by transesterification of alkoxysiloxanes with polyetherols in the presence of trifluoromethanesulfonate salts as catalyst, wherein the computational total water content of the reactants consisting of alkoxysiloxanes and polyetherols is ≤5000 ppm by mass, advantageously ≤300 ppm by mass, preferably ≤150 ppm by mass, more preferably ≤100 ppm by mass, in particular ≤50 ppm by mass, wherein the determination of the individual water contents is performed beforehand, preferably by titration according to Karl Fischer.

2.) Process according to embodiment 1, characterized in that the catalyst
is a metal trifluoromethanesulfonate according to formula (I)

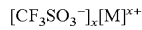

where M is a metal atom selected from zinc, bismuth, aluminium, iron or selected from sodium, potassium with the proviso that methanesulfonic acid is present, and x is a number up to a maximum valency of the metal atom selected for M.

3.) Process according to embodiment 1 or 2, characterized in that the catalyst is employed in amounts of 0.01 to 1.0 percent by weight, preferably 0.07 to 0.8 percent by weight, based on the mass of the reaction matrix consisting of polyetherol and alkoxysiloxane.

4.) Process according to at least one of embodiments 1 to 3, characterized in that the polyetherol is employed in amounts of preferably in each case 0.8 to 2.0 OH-equivalents, particularly preferably 0.8 to 1.3 OH-equivalents, based on every alkoxy group bonded to the silicone skeleton.

5.) Process according to at least one of embodiments 1 to 4, characterized in that the alkoxysiloxanes conform to at least one of the formulae (II) to (VI):

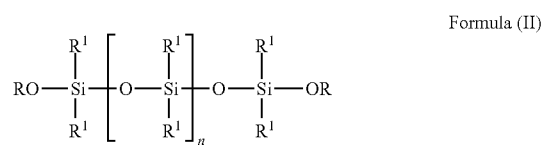

Formula (II)

where R$^1$=alkyl and/or aralkyl and/or aromatic radical comprising 1 to 10 carbon atoms, R=alkyl radical comprising 1 to 8 carbon atoms and where 1≤n≤250 and/or

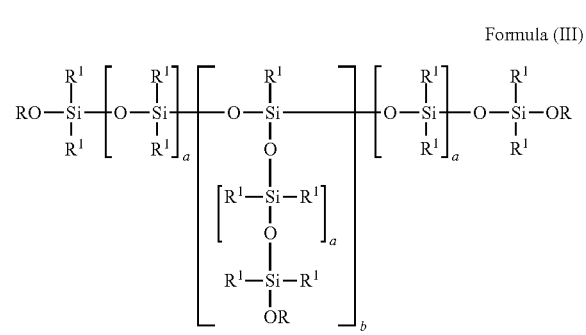

Formula (III)

where R$^1$=alkyl and/or aralkyl and/or aromatic radical comprising 1 to 10 carbon atoms, R=alkyl radical comprising 1 to 8 carbon atoms and where 1≤a≤60 and where 0<b≤10 and/or

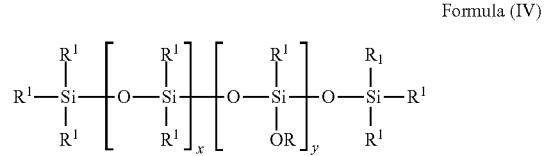

Formula (IV)

where R$^1$=alkyl and/or aralkyl and/or aromatic radical comprising 1 to 10 carbon atoms, R=alkyl radical comprising 1 to 8 carbon atoms and where 0≤x≤250 and where 1≤y≤50 and/or

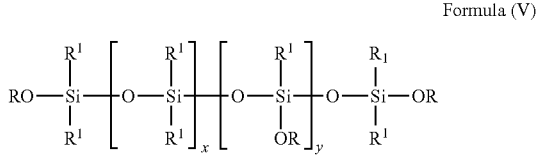
Formula (V)

where R¹=alkyl and/or aralkyl and/or aromatic radical comprising 1 to 10 carbon atoms,
R=alkyl radical comprising 1 to 8 carbon atoms and
where $0 \leq x \leq 250$ and
$1 \leq y \leq 50$
and/or

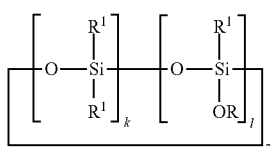
Formula (VI)

where R¹=alkyl and/or aralkyl and/or aromatic radical comprising 1 to 10 carbon atoms,
R=alkyl radical comprising 1 to 8 carbon atoms and
where $4 \leq (k+l) \leq 5$ and
$l \geq 1$.

6.) Process according to at least one of embodiments 1 to 5, characterized in that the alkoxysiloxanes are preferably compounds of formula (II) and/or formula (III).

7.) Process according to at least one of embodiments 1 to 6, characterized in that the employed polyetherols are preferably those of formula (VII)

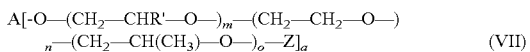

where
A is either hydrogen or an at least one carbon atom-comprising saturated or unsaturated organic radical, preferably an at least one carbon atom-comprising organic radical of an organic starter compound for preparing the compound, more preferably a methyl, ethyl, propyl, butyl, vinyl or allyl group,
R' is independently at each occurrence a saturated alkyl group comprising 2-18 carbon atoms or an aromatic radical, preferably an ethyl group or a phenyl radical respectively,
Z is hydrogen,
m=from 0 to 50, preferably from 0 to 30, particularly preferably from 0 to 20,
n=from 0 to 250, preferably from 3 to 220, particularly preferably from 5 to 200,
o=from 0 to 250, preferably from 3 to 220, particularly preferably from 5 to 200,
a=from 1 to 8, preferably from greater than 1 to 6, particularly preferably 1, 2, 3 or 4,
with the proviso that the sum of m, n and o is equal to or greater than 1.

8.) Processes according to at least one of embodiments 1 to 7, characterized in that compounds of formula (VII) comprising exclusively hydrogen atoms, oxygen atoms and carbon atoms are employed.

9.) Process according to at least one of embodiments 1 to 8, characterized in that the transesterification of the alkoxysiloxanes is performed without the use of solvents.

10.) Process according to at least one of embodiments 1 to 8, characterized in that the transesterification of the alkoxysiloxanes is performed in a solvent inert under reaction conditions, wherein preferred solvents are toluene and/or xylenes in pure form or as an isomer mixture and wherein these solvents are preferably employed in total amounts of 5% to 35% by weight, preferably 10% to 35% by weight, based on the mass of the reaction matrix and wherein the total water content of the solvents is ≤50 ppm by mass, preferably ≤25 ppm by mass, particularly preferably ≤10 ppm by mass, wherein the determination of the water content is performed by titration according to Karl Fischer.

11.) Process according to one of embodiments 1 to 10, characterized in that the transesterification reaction is performed in a temperature range of 80° C. to 180° C. preferably 110° C. to 150° C.

12.) Process according to at least one of embodiments 1 to 11, characterized in that the transesterification reaction is performed at reduced pressure and with passing through of an inert gas.

13.) Use of the SiOC-bonded polyether siloxanes produced according to at least one of embodiments 1 to 12 whose polyether portion is derived from the alkoxylation of unsaturated starter alcohols, preferably from allyl alcohol, as PU foam stabilizer, defoamer and/or deaerator and also as defoamer and/or deaerator components in paint and binder systems.

DETAILED DESCRIPTION OF THE INVENTION

The present invention accordingly provides a process for producing SiOC-bonded polyether siloxanes by transesterification of alkoxysiloxanes with polyetherols in the presence of trifluoromethanesulfonate as catalyst, wherein the computational total water content of the reactants, consisting of alkoxysiloxanes and polyetherols, is ≤5000 ppm by mass, advantageously ≤300 ppm by mass, preferably ≤150 ppm by mass, more preferably ≤10 ppm by mass, in particular ≤50 ppm by mass, wherein the determination of the individual water contents is performed beforehand, preferably by titration according to Karl Fischer.

The proportions of water may be determined by various methods known per se. However, Karl Fischer titration, for example according to DIN 51777, is particularly suitable.

The term "Karl Fischer titration" refers to the method of quantitative oxidimetric determination of water developed by Karl Fischer and known to those skilled in the art. The analysis may be performed by volumetric means and, for smaller water amounts (in particular ≤200 ppm by mass), preferably also by coulometric means. The titration end point is revealed by an iodine excess which may be indicated by visual, photometric or electrometric means. All this is well known to those skilled in the art.

In the examples section, the water determination according to Karl Fischer is described more particularly with reference to DIN 51777, DGF E-III 10 and DGF C-III 13a. The DGF standard refers to the "DGF-Einheitsmethoden" i.e. the loose-leaf publication "Deutsche Einheitsmethoden zur Untersuchung von Fetten, Fettprodukten, Tensiden und verwandten Stoffen", 2nd edition including 22nd update. ISBN10:3804723470, wissenschaftliche Verlagsgesellschaft.

The term "computational total water content" is to be understood as meaning that the water content of the individual components, comprising alkoxysiloxanes and polyetherols, is captured separately for each individual component and subsequently summed to afford the computational total water content. This water content relates to the situation before reaction commencement which is initiated by temperature elevation and catalyst addition.

In the context of the present invention, it is particularly preferred and thus corresponds to a particularly preferred embodiment when the total water content of the reactants, consisting of alkoxysiloxanes and polyetherols, is ≤5000 ppm by mass, preferably ≤300 ppm by mass, more preferably ≤100 ppm by mass, in particular ≤50 ppm by mass, wherein the determination of the water content is performed by titration according to Karl Fischer, in particular by coulometric Karl Fischer titration.

The advantages of the catalyst for use according to the invention include that it obviates the use of acids or bases which in operational practice require elevated safety measures for their handling and even for the choice of suitable container materials. The catalyst according to the invention likewise obviates the otherwise customary neutralization of acids or bases after completion of the reaction and also avoids the cost and complexity adding filtration step for removal of the salt. In addition, the by-product hexamethylcyclotrisiloxane (D3) can be minimized or significantly reduced.

Further undesired effects arising from the use of strong acids as transesterification catalysts result from the severe dark discoloration of the products and from the subsequent equilibration thereof. The comparative example (example 8, cf. examples section below) elucidates that, while in a system consisting of an α,ω-diethoxypolydimethylsiloxane and a polyetherol in the presence of a catalytic amount of trifluoromethanesulfonic acid (0.1% by weight based on the total weight of the reactants), quantitative conversions are achieved, the isolated final product exhibits dark brown discoloration and additionally contains considerable amounts of cyclic polydimethylsiloxanes ($D_4$ and $D_5$). These quality deficits are in no way acceptable on the product side.

The catalyst for use according to the invention has a less critical toxicological profile compared to organotin transesterification catalysts. Compared to the otherwise also often employed hydrolysis-sensitive titanate catalysts, triflate salts have the advantage of hydrolytic insensitivity, i.e. zinc triflate may also be portioned, metered and transferred without inertization in an ordinary atmosphere.

Trifluoromethanesulfonate salts are preferably suitable as catalyst for the transesterification reaction of systems consisting of alkoxypolysiloxane and polyetherol that are inputs for demanding applications, for example paint additives. These additives show practically no error tolerance in sensitive coating systems and are thus sensitive indicators for process-contingent deviations from the chemical nature of the material.

It has been found in the context of the present invention that, surprisingly, not only polyetherols derived from the alkoxylation reaction of saturated starter alcohols but for example also those derived from the alkoxylation of unsaturated starter alcohols, for example allyl alcohol, are suitable for the transesterification reaction.

This finding is important especially for SiOC-bonded silicone polyether copolymers as additives in coating systems because it allows for incorporation of terminally unsaturated groups which in turn bring about a dispersion-stabilizing effect for example in pigment-filled paint and binder systems. The invention accordingly further provides for the use of the SiOC-bonded polyether siloxanes produced by processes according to the invention whose polyether portion is derived from the alkoxylation of unsaturated starter alcohols, preferably from allyl alcohol, as defoamers and/or deaerators and also as defoamer and/or deaerator components in paint and binder systems.

Trifluoromethanesulfonate salt for use as transesterification catalyst according to the invention allows, even under moderate conditions, virtually quantitative exchange of the alkoxy groups bonded to the silicone skeleton for polyetherols without occurrence of side reactions such as equilibration or skeletal rearrangement of the employed silicone body. High resolution $^{29}$Si-NMR spectroscopy is particularly suitable for detecting such undesired side reactions.

The reliable reproducibility of the transesterification reactions induced by using the catalyst according to the invention is additionally underscored by test series and said catalyst is thereby already qualified for operational practice.

While the inventive trifluoromethanesulfonate catalyst itself features good hydrolytic stability, in the transesterification reaction it is preferable to ensure that systemic anhydrousness is adhered to very carefully, i.e. both the employed alkoxy-comprising siloxane and employed polyetherol and also any employed solvents are preferably to be employed in substantially anhydrous form and/or subjected to suitable drying processes.

The total water content of the reactants, consisting of alkoxysiloxanes and polyetherols, is ≤5000 ppm by mass, advantageously ≤300 ppm by mass, preferably ≤150 ppm by mass, more preferably ≤100 ppm by mass, in particular ≤550 ppm by mass, wherein the determination of the water content is performed by titration according to Karl Fischer.

Those skilled in the art accomplish the desired systemic anhydrousness via commonplace processes, for example the use of commonplace drying agents (for example sodium sulfate, calcium oxide, etc.).

In the context of the present invention, azeotropic drying and the stripping process in particular have proven useful for producing the desired anhydrousness.

A suitable method for the drying of the employed reaction mixtures is thus preferably azeotropic drying, in which the polyetherol and/or alkoxysiloxane to be dried is admixed with a sufficient amount of a low boiling solvent which forms with the water originating from the polyetherol and/or alkoxysiloxane an azeotrope removable by distillation.

A further preferred option for drying the reaction mixture employed in the transesterification reaction may be realized via the stripping process, namely for example by passing an inert gas stream (preferably for a period of about 2 hours) through the system which is preferably heated (for example to 140° C.) and subjected to an auxiliary vacuum (for example 1 mbar). In the context of a drying that is gentle to the product (avoidance of oxidative processes), preference is given to nitrogen or argon as inert gases to be employed. This stripping operation results in a drying that is particularly intensive in the context of the invention and constitutes a preferred drying process. A particularly preferred embodiment comprises at the end of the drying phase, while still hot, breaking the applied auxiliary vacuum by massive application of an inert gas, subsequently admixing the reaction matrix with a catalytic amount of trifluoromethanesulfonate salts, reapplying an auxiliary vacuum and once again passing a stream of inert gas through the reaction matrix over (for example 5 hours) to expel the alkanol originating from the alkoxypolysiloxane.

The examples according to the invention underscore what is stated hereinabove. For example, the zinc triflate catalyst employed in inventive example 1 has a water content of 0.4% by weight. After a two-hour transesterification reaction this results in quantitative conversion being achieved and GC analysis reveals the by-product hexamethylcyclotrisiloxane D3 is present in an amount of 1.9%.

The comparative example (example 7=EP 34 38 158 A1) using zinc acetylacetonate affords a product comprising a large amount of D3 (17.1%). The terms "trifluoromethanesulfonate salts", "metal trifluoromethanesulfonates", "triflates" and "metal triflates" are to be understood as being synonymous here.

It is preferable when in the transesterification reaction according to the invention the polyetherol is employed in amounts of preferably in each case 0.8 to 2.0 OH-equivalents, particularly preferably 0.8 to 1.3 OH-equivalents, based on every alkoxy group bonded to the silicone skeleton. This corresponds to a preferred embodiment of the invention.

In a preferred embodiment of the invention, the inventive transesterification of the alkoxysiloxanes is performed without the use of solvents. In the context of this embodiment, pre-dried reactants in particular are employed.

In another preferred embodiment of the process according to the invention, the transesterification reaction is performed in a solvent inert under reaction conditions. Particularly preferred solvents are toluene and xylenes in pure form or as an isomer mixture. It is preferable to perform the transesterification reaction in the solvent which was previously used to perform the optional azeotropic drying of one or more reactants or system components. To ensure the systemic anhydrousness desired according to the invention, the preferably employed solvents may for example also optionally be subjected to a very effective pre-drying for example with sodium/benzophenone and subsequent distillation under inert gas application.

The total water content of the optional solvents should advantageously be ≤50 ppm by mass, preferably ≤25 ppm by mass, particularly preferably ≤10 ppm by mass, wherein the determination of the water content is preferably performed by a coulometric titration according to Karl Fischer.

Solvents are preferably employed in amounts of 5% to 35% by weight, preferably 10% to 35% by weight, based on the mass of the reaction matrix.

It is likewise possible to perform the transesterification reaction in the absence of solvents.

At atmospheric pressure (1013.25 hPa) the transesterification reaction according to the invention is performed in a temperature range upwardly limited by the boiling point of an optionally chosen solvent. It is preferable according to the invention to choose transesterification temperatures between 110° C. and 150° C. This corresponds to a preferred embodiment of the invention.

Trifluoromethanesulfonate salt is preferably employed in amounts of 0.01 to 1.0 percent by weight, more preferably 0.07 to 0.8 percent by weight, based on the mass of the reaction matrix consisting of polyetherol and alkoxypolysilane.

It is preferable when anhydrous trifluoromethanesulfonate salt is employed in the context of the invention. If water-containing trifluoromethanesulfonate salt precursor complexes are to be employed for the process claimed in accordance with the invention, the requirement to be largely anhydrous as elucidated for the use of polyetherol, alkoxysiloxane and optionally solvent applies correspondingly, i.e. these catalysts should then preferably still be dried by suitable means (for example also by azeotropic drying) before use. The presence of water of crystallization bound to the trifluoromethanesulfonate salt does not in principle inhibit the efficacy thereof according to the invention but does have the effect that the transesterification reactions catalysed therewith are retarded.

In the context of a preferred transesterification reaction which advantageously proceeds rapidly and completely, trifluoromethanesulfonate salt according to the invention should preferably have water contents of less than 7.5% by weight, preferably less than 5% by weight and very particularly preferably ≤2% by weight.

In preferably employable processes the catalyst is a metal trifluoromethanesulfonate according to formula (1)

$$[CF_3SO_3^-]_x[M]^{x+} \qquad (I)$$

where M is a metal atom selected from zinc, bismuth, aluminium, iron or selected from sodium, potassium with the proviso that methanesulfonic acid is present, and x is a number up to a maximum valency of the metal atom selected for M.

Alkoxypolysiloxanes preferably employable according to the invention are selected from the compounds of formula (II) to formula (VI), wherein use of the alkoxypolysiloxanes according to formula (II) and/or formula (III) is particularly preferred.

Formula (II)

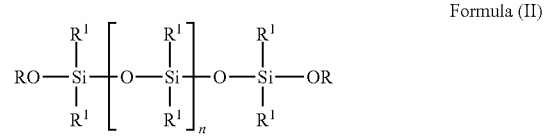

where $R^1$=alkyl and/or aralkyl and/or aromatic radical comprising 1 to 10 carbon atoms,
R=alkyl radical comprising 1 to 8 carbon atoms and
where $1 \leq n \leq 250$ Formula (III)

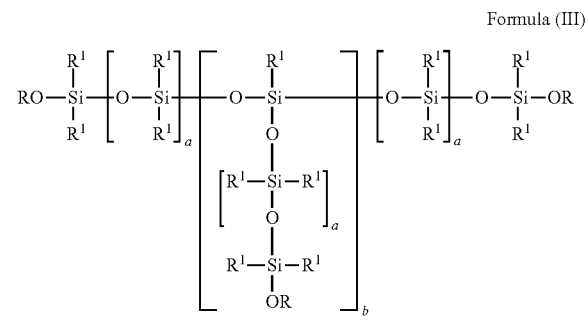

where $R^1$=alkyl and/or aralkyl and/or aromatic radical comprising 1 to 10 carbon atoms,
R=alkyl radical comprising 1 to 8 carbon atoms and
where $1 \leq a \leq 60$ and
where $0 < b \leq 10$ Formula (IV)

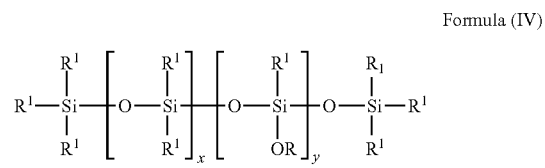

where $R^1$=alkyl and/or aralkyl and/or aromatic radical comprising 1 to 10 carbon atoms,
R=alkyl radical comprising 1 to 8 carbon atoms and
where $0 \leq x \leq 250$ and
where $1 \leq y \leq 50$ Formula (V)

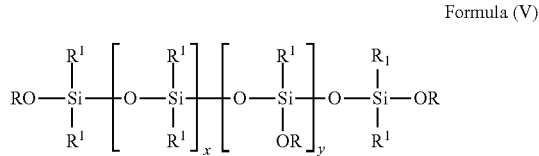

where $R^1$=alkyl and/or aralkyl and/or aromatic radical comprising 1 to 10 carbon atoms,
R=alkyl radical comprising 1 to 8 carbon atoms and
where $0 \leq x \leq 250$ and
$1 \leq y \leq 50$ Formula (VI)

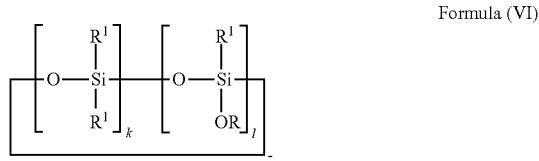

where $R^1$=alkyl and/or aralkyl and/or aromatic radical comprising 1 to 10 carbon atoms,
R=alkyl radical comprising 1 to 8 carbon atoms and
where $4 \leq (k+l) \leq 5$ and
$l \geq 1$.

The polyetherols employable according to the invention are preferably those of formula (VII)

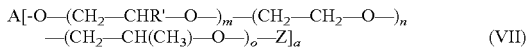

where
A is hydrogen or an at least one carbon atom-comprising saturated or unsaturated organic radical, preferably an at least one carbon atom-comprising organic radical of an organic starter compound for preparing the compound, particularly preferably a methyl, ethyl, propyl, butyl, vinyl or allyl group,
R' is independently at each occurrence a saturated alkyl group comprising 2-18 carbon atoms or an aromatic radical, preferably an ethyl group or a phenyl radical respectively,
Z is hydrogen,
m=from 0 to 50, preferably from 0 to 30, particularly preferably from 0 to 20,
n=from 0 to 250, preferably from 3 to 220, particularly preferably from 5 to 200,
o=from 0 to 250, preferably from 3 to 220, particularly preferably from 5 to 200,
a=from 1 to 8, preferably from greater than 1 to 6, particularly preferably 1, 2, 3 or 4,
with the proviso that the sum of m, n and o is equal to or greater than 1.

It is preferable to employ compounds of formula (VII) comprising exclusively hydrogen atoms, oxygen atoms and carbon atoms.

The index values recited here, and the value ranges of the indices specified may be understood to mean averages (weight averages) of the possible statistical distribution of the structures actually present and/or the mixtures thereof. This also applies to structural formulae exactly reproduced per se as such, for example to formula (VII).

The units labelled m, n, and o may either be statistically mixed or else may form a blockwise arrangement in the chain. Statistical distributions may have a blockwise structure with any number of blocks and any sequence or be subject to a randomized distribution; they may also have an alternating structure or else form a gradient along the chain; in particular, they can also form any mixed forms thereof in which groups of different distributions may follow one another. Specific embodiments may lead to restrictions to the statistical distributions as a result of the embodiment. There is no change in the statistical distribution for all regions unaffected by the restriction.

In the context of the present invention, radical A is preferably to be understood as meaning radicals of substances forming the start of the to-be-produced compound of formulae (V) which is obtained by addition of alkylene oxides. The starter compound is preferably selected from the group of alcohols, polyetherols and phenols. It is preferable to use as the starter compound containing the group A a mono- or polyfunctional polyether alcohol and/or a mono- or polyfunctional alcohol or any desired mixtures thereof. If a plurality of starter compounds A has been used as a mixture, the index a may also be subject to a statistical distribution. Z may in addition also be the radical of a starter compound Z—OH.

Monomers used with preference in the alkoxylation reaction are ethylene oxide, propylene oxide, butylene oxide and/or styrene oxide and also any desired mixtures of these epoxides. The different monomers may be used in pure form or as a mixture. A further epoxide can also be metered continuously over time into an epoxide already present in the reaction mixture, so as to give rise to an increasing concentration gradient of the epoxide added continuously. The polyoxyalkylenes formed are thus subject to a statistical distribution in the end product, restrictions being determinable via the metered addition. In this case of the continuous addition of a further epoxide to an epoxide already present in the reaction mixture, a structure gradient along the length of the chain is to be expected. The correlations between metered addition and product structure are known to those skilled in the art.

It is preferable to employ in the process according to the invention compounds from compound class II having a weight-average molar mass of 76 to 10 000 g/mol, preferably of 100 to 8000 g/mol and particularly preferably of 200 to 6000 g/mol.

Compounds from compound class II that may be employed are preferably compounds derived from a compound of formula (VIII)

wherein the radical A derives from compounds selected from the group consisting of mono- and polyfunctional monomers, oligomers and polymeric alcohols, phenols, carbohydrates and carbohydrate derivatives, wherein particular preference is given to using compounds of formula (VI) where the radical A derives from one or more alcohols from the group of butanol, 1-hexenol, octanol, dodecanol, stearyl alcohol, vinyloxybutanol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol, allyl alcohol, vinyl alcohol or from hydroxyl group-bearing compounds based on natural products.

Particular preference is given to using compounds from compound class II that are liquid at a pressure of 101 325 Pa and a temperature of 23° C. Among these, very particular preference is given to butyl diglycol, dipropylene glycol and propylene glycol.

Compounds of formula (III) employable in accordance with the invention as polyetherols and processes for the production thereof are described for example in EP 0075703, U.S. Pat. No. 3,775,452 and EP 1031603. Suitable processes utilize, for example, basic catalysts, for example alkali metal hydroxides and alkali metal methoxides. The use of KOH is particularly widespread and has been known for many years. Such processes typically comprise reacting a hydroxy-functional starter, generally of low molecular weight, i.e. having a molecular weight below 200 g/mol, such as butanol, allyl alcohol, propylene glycol or glycerol, with an alkylene oxide such as ethylene oxide, propylene oxide, butylene oxide or a mixture of different alkylene oxides in the presence of the alkaline catalyst to afford a polyoxyalkylene polyether. The strongly alkaline reaction conditions in this so-called living polymerization promote various side reactions. The compounds of formulae (II) may also be produced by double metal cyanide catalysis. Polyethers produced by double metal cyanide catalysis generally have a particularly low content of unsaturated end groups of less than or equal to 0.02 milliequivalents per gram of polyether compound (meq/g), preferably less than or equal to 0.015 meq/g, particularly preferably less than or equal to 0.01 meq/g (test method ASTM D2849-69), contain distinctly fewer monools and generally have a low polydispersity of less than 1.5. The polydispersity (PD) may be determined by a method known per se to those skilled in the art by determining by gel permeation chromatography (GPC) both the number-average molecular weight (Mn) and the weight-average molecular weight (Mw). The polydispersity is defined by PD=Mw/Mn. The production of such polyethers is described in U.S. Pat. No. 5,158,922 and EP-A 0654302 for example.

Irrespective of the production route, compounds of formula (VII) preferably having a polydispersity Mw/Mn of 1.0 to 1.5, by preference having a polydispersity of 1.0 to 1.3, are preferentially suitable.

Depending on the alkylene oxide terminus, the polyetherols for use according to the invention may have a primary or secondary OH function. In terms of the aspect of the hydrolytic resistance of the obtained SiOC-bonded polyether siloxanes achieved later, the use of polyetherols comprising a secondary alcohol function is preferred in the context of the inventive teaching.

The invention further provides for the use of the SiOC-bonded polyether siloxanes whose polyether portion is derived from the alkoxylation of unsaturated starter alcohols, preferably from allyl alcohol, butanol or dipropylene glycol, as PU foam stabilizer, defoamer and/or deaerator and also as defoamer and/or deaerator component in paint and binder systems.

The examples which follow are provided merely to elucidate this invention to those skilled in the art and do not constitute any limitation of the claimed process whatsoever. The inventive determination of the water contents is performed in principle with the Karl Fischer method based on DIN 51777, DGF E-IIII 10 and DGF C-III 13a and in particular as described in detail in the examples section. $^{29}$Si-NMR spectroscopy was used in all examples to monitor the progress of the reaction with regard to completeness of the transesterification reaction.

EXAMPLES

In the inventive examples, before addition of the zinc acetylacetonate the computational total water content of the reactants consisting of alkoxysiloxanes and polyetherols was in each case below 300 ppm by mass, wherein the determination of the individual water contents was performed beforehand by titration according to Karl Fischer.

Water determination according to Karl Fischer
Based on DIN 51777, DGF E-III 10 and DGF C-III 13a
The water content is the amount of water calculated from the iodine consumption by the following method. The sample is titrated in the presence of methanol with a solution containing sulfur dioxide and iodine. Since sulfur dioxide and iodine react to afford equivalent amounts of sulfur trioxide and hydrogen iodide only in the presence of water, the iodine consumption can be used to calculate the water content in weight percent.

$$J_2 + SO_2 + H_2O = 2HJ + SO_3$$

Unless otherwise stated, all reagents have the purity grade AR.

Karl Fischer solution: Hydranal Composite 5, Riedel de Haen; 34805
Methanol AR;
Chloroform AR;
Karl Fischer titrator; (for example Metrohm; KF-Titrino 701 or 758)
Titration stand: Metrohm.
Switching unit 20 ml with ceramic cock
Magnetic stirrer bar, 25 mm; for example Metrohm.
Double Pt electrode; Metrohm.
Analytical balance; for example Sartorius AC210S
Drying tube with activated molecular sieves; Metrohm.
The molecular sieves should be replaced for each change of the titration solution. Regeneration of the molecular sieves is performed in a drying cabinet at 180° C.-240° C. over 48 hours.

Procedure

The sample is to be homogenized by thorough stirring.
In a titration vessel, methanol or methanol/chloroform (1:1) are initially charged (fill height ⅓ to ¼ of vessel) and titrated to completion with composite 5. A suitable weight of the sample for determination is weighed into the titration vessel by differential weighing via an analytical balance directly or with a single-use syringe. The titration is performed up to the electrometric endpoint.

Evaluation $$\frac{V \times F}{10 \times E} = \text{water content [\% by weight]}$$

V=consumption of composite 5 solution (ml)
F=factor of composite 5 solution
E=sample weight (g)

In the context of the present invention the $^{29}$Si-NMR samples are measured at 22° C., dissolved in CDCl$_3$ and against tetramethylsilane (TMS) as the external standard [d($^{29}$Si)=0.0 ppm] at a measurement frequency of 79.49 MHz in a Bruker Avance III spectrometer equipped with a 287430 sample head with a 10 mm slot width.

The GPCs (gel permeation chromatography) are recorded using THF as the mobile phase on an SDV 1000/10000A column combination, length 65 cm, ID 0.80, at a temperature of 30° C. using a SECcurity² GPC system 1260 (PSS Polymer Standards Service GmbH).

The gas chromatograms are recorded on an Agilent Technologies GC 7890B GC instrument fitted with an HP-1 column, 30 m×0.32 mm ID×0.25 μm dF (Agilent Technologies no. 19091Z-413E), using hydrogen as the carrier gas and the following parameters:
Detector: FID; 310° C.
Injector: split; 290° C.
Mode: constant flow 2 mL/min
Temperature program: 60° C. at 8° C./min and 150° C. at 40° C./min and 300° C. for 10 min.

The gas-chromatographically determined total cycle content defined as the sum of the $D_4$, $D_5$ and $D_6$ contents based on the siloxane matrix and determined after derivatization of the branched acetoxy-bearing siloxanes to the corresponding branched, isopropoxy-group-bearing siloxanes is used as an indicator for achievement of the equilibrium state. Derivatization into the branched, isopropoxy-group-bearing siloxanes is intentionally chosen to prevent a thermally induced retro-cleavage reaction of the branched acetoxy-group-bearing siloxanes which may optionally take place under the conditions of analysis of gas chromatography (regarding the retro-cleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, O—Metal Derivates of Organic Hydroxy Compounds p. 162 ff)).

Example 1 (Inventive)

In a 500 ml four-necked round-bottom flask having a KPG stirrer, internal thermometer, gas introduction tube and fitted with a distillation bridge, 60.0 g (0.05 mol) of an α,ω-diethoxypolydimethylsiloxane together with an equivalent amount (based on ethoxy groups) of a butanol-started polyetherol (propylene oxide proportion of 100%) having a molar mass of 1870 g/mol (molar mass determined according to OH number) with stirring and application of an oil pump vacuum of 1 mbar were heated to 140° C. for 2 hours, an argon stream of approximately 3 l/hour being passed through the reactant mixture using the gas introduction tube.

The auxiliary vacuum was broken by application of a massive argon stream and 0.17 g of solid zinc triflate (water content in the catalyst was 0.4% by weight) was introduced with inertization into the thus pre-dried heated reaction matrix. The addition was performed at 150° C. and the temperature was kept constant.

Once again, an auxiliary vacuum of 1 mbar was applied and an argon stream of approximately 3 l/hour was passed through the reaction mixture for a period of 5 hours.

After cooling of the reaction batch and renewed breaking of the auxiliary vacuum by argon introduction, a slightly cloudy, SiOC-bonded polyether siloxane was isolated with quantitative alkoxy conversion ($^{29}$Si-NMR spectroscopy).

Corresponding GC analyses of the distillate were performed and the following values determined for D3, D4, D5. D6 and ethanol.

| GC of the distillate | | | | |
|---|---|---|---|---|
| % D3 | % D4 | % D5 | % D6 | % Ethanol |
| 1.9 | 23.7 | 37.3 | 4.6 | 32.5 |

Example 2 (Inventive)

In a 500 ml four-necked round-bottom flask having a KPG stirrer, internal thermometer, gas introduction tube and fitted with a distillation bridge, 100.0 g (0.103 mol) of an α,ω-diethoxypolydimethylsiloxane together with an equivalent amount (based on ethoxy groups) of an allyl alcohol-started polyetherol (propylene oxide proportion of 100%) having a molar mass of 501 g/mol (molar mass determined according to OH number) with stirring and application of an oil pump vacuum of 1 mbar were heated to 130° C. for 2 hours, an argon stream of approximately 3 l/hour being passed through the reactant mixture using the gas introduction tube.

The auxiliary vacuum was broken by application of a massive argon stream and 0.14 g of solid zinc triflate (water content in the catalyst was 2.0% by weight) was introduced with inertization into the thus pre-dried heated reaction matrix. The addition was performed at 130° C. and the temperature was kept constant.

Once again, an auxiliary vacuum of 1 mbar was applied and an argon stream of approximately 3 l/hour was passed through the reaction mixture for a period of 5 hours.

After cooling of the reaction batch and renewed breaking of the auxiliary vacuum by argon introduction, a slightly cloudy, SiOC-bonded polyether siloxane was isolated with an alkoxy conversion determined by $^{29}$Si-NMR spectroscopy of 94%.

Example 3 (Inventive)

In a 500 ml four-necked round-bottom flask having a KPG stirrer, internal thermometer, gas introduction tube and fitted with a distillation bridge, 100.0 g (0.103 mol) of an α,ω-diethoxypolydimethylsiloxane together with an equivalent amount (based on ethoxy groups) of allyl alcohol-started polyetherol (ethylene oxide proportion of 100%) having a molar mass of 387 g/mol (molar mass determined according to OH number) with stirring and application of an oil pump vacuum of 1 mbar were heated to 140° C. for 2 hours, an argon stream of approximately 3 l/hour being passed through the reactant mixture using the gas introduction tube.

The auxiliary vacuum was broken by application of a massive argon stream and 0.13 g of solid zinc triflate (water content in the catalyst was 2.0%) was introduced with inertization into the thus pre-dried heated reaction matrix. The addition was performed at 140° C. and the temperature was kept constant.

Once again, an auxiliary vacuum of 1 mbar was applied and an argon stream of approximately 3 l/hour was passed through the reaction mixture for a period of 5 hours.

After cooling of the reaction batch and renewed breaking of the auxiliary vacuum by argon introduction, a slightly cloudy, slightly yellow SiOC-bonded polyether siloxane was isolated with an alkoxy conversion determined by $^{29}$Si-NMR spectroscopy of 99%.

Example 4 (Inventive)

In a 500 ml four-necked round-bottom flask having a KPG stirrer, internal thermometer, gas introduction tube and fitted with a distillation bridge, 60.0 g (0.065 mol) of a singly branched triethoxypolydimethylsiloxane together with an equimolar amount (based on ethoxy groups) of an allyl alcohol-started polyetherol (propylene oxide proportion of 800%, ethylene oxide proportion of 20%) having a molar mass of 500 g/mol (molar mass determined according to OH number) with stirring and application of an oil pump vacuum of 1 mbar were heated to 140° C. for 2 hours, an argon stream of approximately 3 l/hour being passed through the reactant mixture using the gas introduction tube.

The auxiliary vacuum was broken by application of a massive argon stream and 0.14 g (0.09% by weight) of solid zinc triflate (water content in the catalyst was 2.0%) was introduced with inertization into the thus pre-dried heated reaction matrix. The addition was performed at 140° C. and the temperature was kept constant.

Once again, an auxiliary vacuum of 1 mbar was applied and an argon stream of approximately 3 l/hour was passed through the reaction mixture for a period of 8 hours.

After cooling of the reaction batch and renewed breaking of the auxiliary vacuum by argon introduction, a slightly cloudy, slightly yellow SiOC-bonded polyether siloxane having the desired target structure was isolated with an alkoxy conversion of 990%. Conversion was determined by $^{29}$Si-NMR spectroscopy.

Example 5 (Inventive)

In a 500 ml four-necked round-bottom flask having a KPG stirrer, internal thermometer, gas introduction tube and fitted with a distillation bridge, 60.0 g (0.05 mol) of an α,ω-diethoxypolydimethylsiloxane together with an equivalent amount (based on ethoxy groups) of a butanol-started polyetherol (propylene oxide proportion of 100%) having a molar mass of 1870 g/mol (molar mass determined according to OH number) with stirring and application of an oil pump vacuum of 1 mbar were heated to 140° C. for 2 hours, an argon stream of approximately 3 l/hour being passed through the reactant mixture using the gas introduction tube.

The auxiliary vacuum was broken by application of a massive argon stream and 0.30 g of solid sodium triflate and 0.15 g of methanesulfonic acid were introduced with inertization into the thus pre-dried heated reaction matrix. The addition was performed at 140-150° C. and the temperature was kept constant.

Once again, an auxiliary vacuum of 1 mbar was applied and an argon stream of approximately 3 l/hour was passed through the reaction mixture for a period of 5 hours.

After cooling of the reaction batch and renewed breaking of the auxiliary vacuum by argon introduction, a virtually clear, SiOC-bonded polyether siloxane was isolated at quantitative alkoxy conversion (29Si-NMR spectroscopy).

Example 6 (Inventive)

In a 500 ml four-necked round-bottom flask having a KPG stirrer, internal thermometer, gas introduction tube and fitted with a distillation bridge, 60.0 g (0.05 mol) of an α,ω-diethoxypolydimethylsiloxane together with an equivalent amount (based on ethoxy groups) of a butanol-started polyetherol (polypropylene oxide proportion of 100%) having a molar mass of 1870 g/mol (molar mass determined according to OH number) with stirring and application of an oil pump vacuum of 1 mbar were heated to 140° C. for 2 hours, an argon stream of approximately 3 l/hour being passed through the reactant mixture using the gas introduction tube.

The auxiliary vacuum was broken by application of a massive argon stream and 0.30 g of solid potassium triflate and 0.15 g of methanesulfonic acid were introduced with inertization into the thus pre-dried heated reaction matrix. The addition was performed at 140-150° C. and the temperature was kept constant.

Once again, an auxiliary vacuum of 1 mbar was applied and an argon stream of approximately 3 l/hour was passed through the reaction mixture for a period of 5 hours.

After cooling of the reaction batch and renewed breaking of the auxiliary vacuum by argon introduction, virtually clear, SiOC-bonded polyether siloxane was isolated at quantitative alkoxy conversion (29Si-NMR spectroscopy).

Example 7 (Non-Inventive)

Similarly to example 2, in a 500 ml four-necked round-bottom flask having a KPG stirrer, internal thermometer, gas introduction tube and fitted with a distillation bridge, 100.0 g (0.103 mol) of an α,ω-diethoxypolydimethylsiloxane together with an equivalent amount (based on ethoxy groups) of an allyl alcohol-started polyetherol (polypropylene oxide proportion of 100%) having a molar mass of 501 g/mol (molar mass determined according to OH number, water content was 0.2%) were initially charged and with stirring heated to 130° C.

As soon as the reaction temperature was attained, 0.14 g of solid zinc acetylacetonate (water content 2.0%) was introduced and with stirring and application of an oil pump vacuum of 1 mbar the reaction mixture was heated to 130° C. for 5 hours. The temperature was kept constant.

An argon stream of approximately 3 l/hour was passed through the reaction mixture using the gas introduction tube. After cooling of the reaction batch and renewed breaking of the auxiliary vacuum by argon introduction, virtually clear, SiOC-bonded polyether siloxane was isolated at quantitative alkoxy conversion (29Si-NMR spectroscopy).

Corresponding GC analyses of the distillate were performed and the following values determined for D3, D4, D5, D6 and ethanol.

| GC of the distillate | | | | |
|---|---|---|---|---|
| % D3 | % D4 | % D5 | % D6 | % Ethanol |
| 17.1 | 29.7 | 10.4 | 11.2 | 31.6 |

Example 8 (Non-Inventive)

In a 500 ml four-necked round-bottom flask having a KPG stirrer, internal thermometer, gas introduction tube and fitted with a distillation bridge, 142.1 g (0.119 mol) of an α,ω-diethoxypolydimethylsiloxane together with an equimolar amount (based on ethoxy groups) of a butanol-started polyetherol (80% propylene oxide proportion, 20% ethylene oxide proportion) having a molar mass of 484 g/mol (molar mass determined according to OH number) with stirring and application of an oil pump vacuum of 1 mbar were heated to 10° C. for 2 hours, an argon stream of approximately 3 l/hour being passed through the reactant mixture using the gas introduction tube.

The mixture was allowed to cool to 100° C. and the auxiliary vacuum was broken by application of a massive argon stream and trifluoromethanesulfonic acid (0.15 ml=0.1% by weight) was added with inertization using a Hamilton syringe into the thus pre-dried heated reaction matrix.

At an internal temperature of 100° C. and with constant stirring, once again an auxiliary vacuum of 250 mbar was applied and an argon stream of approximately 3 l/hour was passed through the reaction mixture for a period of 9 hours.

To neutralize the trifluoromethanesulfonic acid, 1.88 g of Na$_2$CO$_3$·H$_2$O and 3.5 g of NaHCO$_3$ were added with stirring. The mixture was allowed to react for 2 hours, the salts were removed by filtration and the filtrate was distilled for 2 hours at 130° C. and a pressure of 1 mbar to remove cyclic siloxanes (D$_4$/D$_5$).

A clear, but brown-black discoloured, material exhibiting a quantitative alkoxy conversion according to $^{29}$Si-NMR spectroscopy was isolated.

Example 9 (Non-Inventive)

In a 500 ml four-necked round-bottom flask having a KPG stirrer, internal thermometer, gas introduction tube and fitted with a distillation bridge, 100.0 g (0.103 mol) of an α,ω-diethoxypolydimethylsiloxane together with an equimolar amount (based on ethoxy groups) of a butanol-started polyetherol (propylene oxide proportion of 100%) having a molar mass of 1870 g/mol (molar mass determined according to OH number) with stirring and application of an oil pump vacuum of 1 mbar were heated to 140° C. for 2 hours, an argon stream of approximately 3 l/hour being passed through the reactant mixture using the gas introduction tube.

The auxiliary vacuum was broken by application of a massive argon stream and 0.48 g of titanium(IV) butoxide (Fluka) was introduced with inertization into the thus pre-dried heated reaction matrix. The addition was performed at 140° C. and the temperature was kept constant.

Once again, an auxiliary vacuum of 1 mbar was applied and an argon stream of approximately 3 l/hour was passed through the reaction mixture. After a reaction time of 5 hours, a heterogeneous biphasic product was obtained and analysis was therefore eschewed.

Example 10 (Non-Inventive)

In a 500 ml four-necked round-bottom flask having a KPG stirrer, internal thermometer, gas introduction tube and fitted with a distillation bridge, 100.0 g (0.103 mol) of an α,ω-diethoxypolydimethylsiloxane together with an equimolar amount (based on ethoxy groups) of a butanol-started polyetherol (propylene oxide proportion of 80%, ethylene oxide proportion of 20%) having a molar mass of 484 g/mol (molar mass determined according to OH number) with stirring and application of an oil pump vacuum of 1 mbar were heated to 140° C. for 2 hours, an argon stream of approximately 3 l/hour being passed through the reactant mixture using the gas introduction tube.

The auxiliary vacuum was broken by application of a massive argon stream and 0.199 g of solid zirconium(IV) acetvlacetonate (Sigma-Aldrich) was introduced with inertization into the thus pre-dried heated reaction matrix. The addition was performed at 140° C. and the temperature was kept constant.

Once again, an auxiliary vacuum of 1 mbar was applied and an argon stream of approximately 3 l/hour was passed through the reaction mixture. After a reaction time of 5 hours, a heterogeneous biphasic product was obtained and analysis was therefore eschewed.

Example 11 (Non-Inventive)

In a 500 ml four-necked round-bottom flask having a KPG stirrer, internal thermometer, gas introduction tube and fitted with a distillation bridge, 100.0 g (0.103 mol) of an α,ω-diethoxypolydimethylsiloxane together with an equimolar amount (based on ethoxy groups) of a butanol-started polyetherol (propylene oxide proportion of 80%, ethylene oxide proportion of 20%0) having a molar mass of 484 g/mol (molar mass determined according to OH number) with stirring and application of an oil pump vacuum of 1 mbar were heated to 130° C. for 2 hours, an argon stream of approximately 3 l/hour being passed through the reactant mixture using the gas introduction tube.

The auxiliary vacuum was broken by application of a massive argon stream and 3.99 g of zirconium(IV) acetylacetonate solution (5% in THF) was introduced with inertization into the thus pre-dried heated reaction matrix. The addition was performed at 130° C. and the temperature was kept constant.

Once again, an auxiliary vacuum of 1 mbar was applied and an argon stream of approximately 3 l/hour was passed through the reaction mixture. After a reaction time of 5 hours, a heterogeneous biphasic product was obtained and analysis was therefore eschewed.

The invention claimed is:

1. A process for producing a SiOC-bonded polyether siloxane, comprising:

transesterifying an alkoxysiloxane with a polyetherol in the presence of a trifluoromethanesulfonate salt as a catalyst comprising a metal trifluoromethanesulfonate according to formula (I):

$$[CF3SO3]_x[M]^{x+} \quad \text{formula (1)},$$

wherein M is a metal atom selected from the group consisting of zinc, bismuth, aluminium, and iron, or selected from the group consisting of sodium and potassium, with the proviso that methanesulfonic acid is present, and x is a number up to a maximum valency of the metal atom selected for M wherein a computational total water content of reactants consisting of the alkoxysiloxane and the polyetherol is <5000 ppm by mass, wherein determination of an individual water content is performed before the transesterifying.

2. The process according to claim 1, wherein the catalyst is employed in an amount of 0.01 to 1.0 percent by weight based on a mass of a reaction matrix consisting of the polyetherol and the alkoxysiloxane.

3. The process according to claim 1, wherein the polyetherol is employed in an amount of in each case 0.8 to 2.0 OH-equivalents, based on every alkoxy group bonded to a silicone skeleton of the alkylsiloxane.

4. The process according to claim 1, wherein the alkoxysiloxane conforms to at least one of formulae (II) to (VI):

Formula (II)

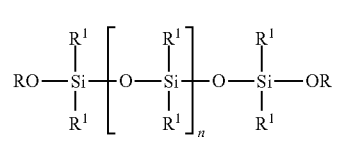

wherein R¹=alkyl and/or aralkyl and/or aromatic radical comprising 1 to 10 carbon atoms,
R=alkyl radical comprising 1 to 8 carbon atoms, and
wherein $1 \leq n \leq 250$, and/or Formula (III)

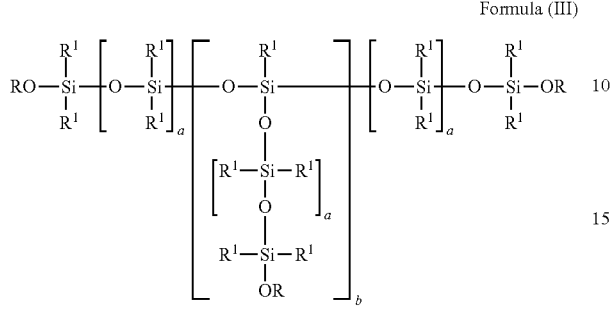

wherein R¹=alkyl and/or aralkyl and/or aromatic radical comprising 1 to 10 carbon atoms,
R=alkyl radical comprising 1 to 8 carbon atoms,
wherein $1 \leq a \leq 60$, and
wherein $0 < b \leq 10$, and/or Formula (IV)

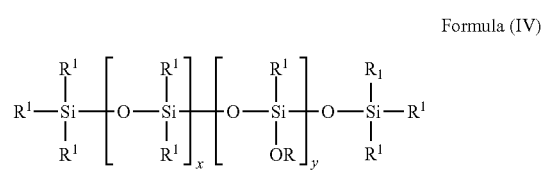

wherein R¹=alkyl and/or aralkyl and/or aromatic radical comprising 1 to 10 carbon atoms,
R=alkyl radical comprising 1 to 8 carbon atoms,
wherein $0 \leq x \leq 250$, and
wherein $1 \leq y \leq 50$, and/or Formula (V)

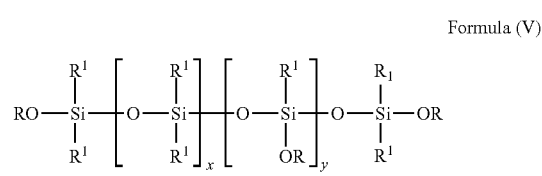

wherein R¹=alkyl and/or aralkyl and/or aromatic radical comprising 1 to 10 carbon atoms,
R=alkyl radical comprising 1 to 8 carbon atoms,
wherein $0 \leq x \leq 250$, and
$1 \leq y \leq 50$, and/or Formula (VI)

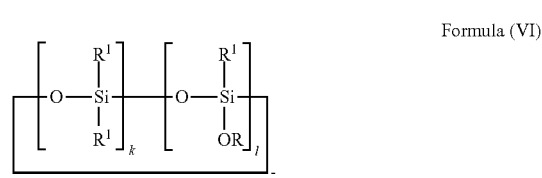

wherein R¹=alkyl and/or aralkyl and/or aromatic radical comprising 1 to 10 carbon atoms,
R=alkyl radical comprising 1 to 8 carbon atoms,
wherein $4 \leq (k+1) \leq 5$, and
$l \geq 1$.

5. The process according to claim 4, wherein the alkoxysiloxane is at least one of formula (II) and/or formula (III).

6. The process according to claim 1, wherein the polyetherol is of formula (VII):

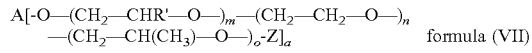

wherein
A is either hydrogen or at least one carbon atom-comprising saturated or unsaturated organic radical,
R' is independently at each occurrence a saturated alkyl group comprising 2-18 carbon atoms or an aromatic radical,
Z is hydrogen,
m=from 0 to 50,
n=from 0 to 250,
o=from 0 to 250, and
a=from 1 to 8,
with the proviso that a sum of m, n, and o is equal to or greater than 1.

7. The process according to claim 6, wherein the polyetherol of formula (VII) consists of hydrogen atoms, oxygen atoms, and carbon atoms.

8. The process according to claim 1, wherein the transesterifying of the alkoxysiloxane is performed without a use of solvents.

9. The process according to claim 1, wherein the transesterifying of the alkoxysiloxane is performed in a solvent inert under reaction conditions, wherein a total water content of the solvent is ≤50 ppm by mass, and wherein the determination of the total water content of solvent is determined by Karl Fischer titration.

10. The process according to claim 1, wherein the transesterifying is performed in a temperature range of 80° C. to 180° C.

11. The process according to claim 1, wherein the transesterifying is performed at reduced pressure and with passing through of an inert gas.

12. A product, comprising:
the SiOC-bonded polyether siloxane produced according to claim 1, whose polyether portion is derived from alkoxylation of an unsaturated starter alcohol, as PU foam stabilizer, defoamer and/or deaerator and also as defoamer and/or deaerator components in paint and binder systems.

13. The process according to claim 1, wherein the computational total water content of the reactants consisting of the alkoxysiloxane and the polyetherol is ≤50 ppm by mass, and wherein the determination of the individual water content is performed beforehand by Karl Fischer titration.

14. The process according to claim 2, wherein the catalyst is employed in an amount of 0.07 to 0.8 percent by weight, based on the mass of the reaction matrix.

15. The process according to claim 3, wherein the polyetherol is employed in an amount of in each case 0.8 to 1.3 OH-equivalents, based on every alkoxy group bonded to the silicone skeleton.

16. The process according to claim 6, wherein
A is at least one carbon atom-comprising organic radical of an organic starter compound for preparing the polyetherol, selected from the group consisting of a methyl, ethyl, propyl, butyl, vinyl, and allyl group,
R' is independently at each occurrence an ethyl group or a phenyl radical, m=from 0 to 20,
n=from 5 to 200,
o=from 5 to 200, and
a=from 1, 2, 3 or 4.

17. The process according to claim 9,
wherein the solvent is at least one selected from the group consisting of toluene and xylene, in pure form or as an isomer mixture,
wherein the solvent is employed in total amounts of 5% to 35% by weight based on the mass of the reaction matrix, and
wherein the total water content of the solvent is ≤10 ppm by mass.

18. The process according to claim 10, wherein the transesterifying is performed in a temperature range of 110° C. to 150° C.

19. The product according to claim 12, wherein the unsaturated starter alcohol is allyl alcohol.

20. The process according to claim 1, wherein the catalyst consists of a metal trifluoromethanesulfonate according to formula (I):

$[CF_3SO_3^-]_x[M]^{x+}$      formula (I), wherein M is a metal atom selected from the group consisting of zinc, bismuth, aluminium, and iron,
or
selected from the group consisting of sodium and potassium, with the proviso that methanesulfonic acid is present,
and x is a number up to a maximum valency of the metal atom selected for M.

21. The process according to claim 1, wherein the catalyst consists of a metal trifluoromethanesulfonate according to formula (I):

$[CF_3SO_3^-]_x[M]^{x+}$      formula (I), wherein M is a metal atom selected from the group consisting of zinc, bismuth, aluminium, and iron, and x is a number up to a maximum valency of the metal atom selected for M.

22. The process according to claim 1, wherein the catalyst consists of zinc triflate.

23. The process according to claim 1, wherein the catalyst consists of sodium triflate and methanesulfonic acid or potassium triflate and methanesulfonic acid.

24. The process according to claim 1, wherein the catalyst comprises a metal trifluoromethanesulfonate according to formula (I):

$[CF_3SO_3^-]_x[M]^{x+}$      formula (I), wherein M is a metal atom selected from the group consisting of zinc, bismuth, aluminium, and iron, and x is a number up to a maximum valency of the metal atom selected for M.

* * * * *